United States Patent
Knutson et al.

(10) Patent No.: US 11,022,698 B1
(45) Date of Patent: Jun. 1, 2021

(54) SYSTEM AND METHOD FOR DETERMINING VEHICLE LOCATION

(71) Applicant: Aptiv Technologies Limited, St. Michael (BB)

(72) Inventors: Eric P. Knutson, Kokomo, IN (US); David M. Spell, Kokomo, IN (US); Linh Pham, Kokomo, IN (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 16/788,567

(22) Filed: Feb. 12, 2020

(51) Int. Cl.
*H04W 74/00* (2009.01)
*G01S 19/25* (2010.01)
*G01S 5/00* (2006.01)
*G01S 19/42* (2010.01)

(52) U.S. Cl.
CPC ............ *G01S 19/25* (2013.01); *G01S 5/0009* (2013.01); *G01S 19/42* (2013.01); *G01S 2205/002* (2013.01)

(58) Field of Classification Search
USPC .......................... 342/357.24, 352; 455/456.1
See application file for complete search history.

(56) References Cited

U.S. PATENT DOCUMENTS

| | | | |
|---|---|---|---|
| 5,416,712 A | | 5/1995 | Geier et al. |
| 5,587,715 A | * | 12/1996 | Lewis ...................... G01S 19/36 342/357.24 |
| 5,890,090 A | | 3/1999 | Nelson |
| 9,002,373 B2 | * | 4/2015 | Marti ..................... H04W 24/00 455/456.1 |
| 9,215,670 B2 | * | 12/2015 | Sawai ...................... H04W 4/02 |
| 9,609,477 B2 | * | 3/2017 | Rotstein ................ H04W 4/021 |
| 10,310,066 B1 | * | 6/2019 | Zatman .................... G01S 13/46 |
| 2016/0126625 A1 | * | 5/2016 | Gurewitz ........... H04B 7/18517 342/353 |
| 2017/0242132 A1 | * | 8/2017 | Kim ........................ G01S 19/45 |
| 2018/0372879 A1 | * | 12/2018 | Whitehead .............. G01S 19/55 |
| 2019/0265365 A1 | * | 8/2019 | Skupin .................... G01S 19/49 |

OTHER PUBLICATIONS

U.S. Appl. No. 16/583,902, Dual Antenna Calculated Pseudorange Augmentation, filed Nov. 28, 2018, Knutson, Eric P.
U.S. Appl. No. 16/202,781, Dead-Reckoning Guidance System and Method With Cardinal-Direction Based Coordinate-Corrections, filed Sep. 26, 2019, Knutson, Eric P.
U.S. Appl. No. 16/275,374, Automatic Control of Smartphone Driver Mode in Vehicles, filed Feb. 14, 2019, Oman, Todd P.

* cited by examiner

*Primary Examiner* — David Q Nguyen
(74) *Attorney, Agent, or Firm* — Carlson, Gaskey & Olds

(57) ABSTRACT

An illustrative example embodiment of a system includes a detector configured to detect a signal from a source and provide first signal information regarding a distance a detected signal traveled between the source and the detector. A processor is configured to determine whether the first signal information corresponds to a direct signal path between the detector and the source or the first signal information corresponds to a reflected signal based on second signal information from at least one other detector that does not have a direct signal path between the other detector and the source. The processor determines a location of the detector based on the first signal information only when the first signal information corresponds to the direct signal path between the detector and the source.

18 Claims, 2 Drawing Sheets

SYSTEM AND METHOD FOR DETERMINING VEHICLE LOCATION

BACKGROUND

Modern automotive vehicles include an increasing amount of electronic technology, such as navigation systems that are useful for route guidance or autonomous vehicle control, for example. Many navigation systems operate based on detecting satellite signals and using a known algorithm to determine the current vehicle location. The accuracy of the system depends on the quality of the received and processed satellite signals. There are situations in which satellite signals may not be entirely reliable.

For example, it is possible for satellite signals to reflect off of nearby structures before being received by the navigation system antenna or detector. Such reflections increase the distance travelled by the signal before reaching the antenna or detector compared to a signal travelling directly from the satellite to the antenna or detector. Since a known position of the satellite from which such a signal originates is used for determining the location of the vehicle, any intermediate reflection and resulting increased signal travel distance can introduce errors in the vehicle location determination.

SUMMARY

An illustrative example embodiment of a system includes a detector configured to detect a signal from a source and provide first signal information regarding a distance a detected signal traveled between the source and the detector. A processor is configured to determine whether the first signal information corresponds to a direct signal path between the detector and the source or the first signal information corresponds to a reflected signal based on second signal information from at least one other detector that does not have a direct signal path between the other detector and the source. The processor determines a location of the detector based on the first signal information only when the first signal information corresponds to the direct signal path between the detector and the source.

In an example embodiment including at least one of the features of the system of the previous paragraph, the first signal information comprises a pseudo range between the at least one source and the at least one detector, and the second signal information comprises a distance traveled by a reflected signal between the at least one source and the at least one other detector.

In an example embodiment including at least one of the features of the system of any of the previous paragraphs, the processor is configured to determine that the first signal information corresponds to a reflected signal by determining a difference between the pseudo range of the first signal information and the distance of the second signal information and determining that the determined difference is below a threshold.

In an example embodiment including at least one of the features of the system of any of the previous paragraphs, the processor is configured to determine that the first signal information corresponds to a reflected signal by determining that the pseudo range of the first signal information is greater than the distance of the second signal information.

In an example embodiment including at least one of the features of the system of any of the previous paragraphs, the at least one detector is associated with a vehicle and the determined location is a location of the vehicle.

In an example embodiment including at least one of the features of the system of any of the previous paragraphs, the processor is configured to determine whether the second signal information corresponds to a reflected signal between the at least one source and the at least one other detector by determining a position of the at least one other detector relative to the vehicle, determining a position of the vehicle relative to the at least one source, and determining that at least one portion of the vehicle obstructs a direct signal path between the at least one source and the at least one other detector based on the determined positions.

In an example embodiment including at least one of the features of the system of any of the previous paragraphs, the at least one portion of the vehicle comprises a vehicle roof and the processor uses information regarding at least one of a size of the roof and a shape of the roof to determine that the roof obstructs the direct signal path between the at least one source and the at least one other detector.

An example embodiment including at least one of the features of the system of any of the previous paragraphs includes the at least one other detector and wherein the at least one other detector is situated in a known position relative to a portion of the vehicle where the portion of the vehicle obstructs a direct signal path between the at least one other detector and the at least one source.

In an example embodiment including at least one of the features of the system of any of the previous paragraphs, the at least one source is a satellite having a known location within an earth centered earth fixed reference frame.

An illustrative example embodiment of a method includes: detecting a signal from at least one source, generating first signal information regarding a distance the detected signal traveled between the at least one source and at least one detector, and determining whether the first signal information corresponds to a direct signal path between the at least one detector and the at least one source or the first signal information corresponds to a reflected signal based on second signal information from at least one other detector that does not have a direct signal path between the at least one other detector and the at least one source, and determining a location of the at least one detector based on the first signal information when the first signal information corresponds to the direct signal path between the at least one detector and the at least one source.

In an example embodiment including at least one of the features of the method of the previous paragraph, the first signal information comprises a pseudo range between the at least one source and the at least one detector and the second signal information comprises a distance traveled by a reflected signal between the at least one source and the at least one other detector.

An example embodiment including at least one of the features of the method of any of the previous paragraphs includes determining that the first signal information corresponds to a reflected signal by determining a difference between the pseudo range of the first signal information and the distance of the second signal information and determining that the determined difference is below a threshold.

[owns] An example embodiment including at least one of the features of the method of any of the previous paragraphs includes determining that the first signal information corresponds to a reflected signal by determining that the pseudo range of the first signal information is greater than the distance of the second signal information.

In an example embodiment including at least one of the features of the method of any of the previous paragraphs, the at least one detector is associated with a vehicle and the method comprises determining a location of the vehicle based on the determined location of the at least one detector.

An example embodiment including at least one of the features of the method of any of the previous paragraphs includes determining whether the second signal information corresponds to a reflected signal between the at least one source and the at least one other detector by determining a position of the at least one other detector relative to the vehicle, determining a position of the vehicle relative to the at least one source, and determining that at least one portion of the vehicle obstructs a direct signal path between the at least one source and the at least one other detector based on the determined positions.

[owns] In an example embodiment including at least one of the features of the method of any of the previous paragraphs, the at least one portion of the vehicle comprises a vehicle roof and the method comprises using information regarding at least one of a size of the roof and a shape of the roof to determine that the roof obstructs the direct signal path between the at least one source and the at least one other detector.

In an example embodiment including at least one of the features of the method of any of the previous paragraphs, the at least one other detector is situated in a known position relative to a portion of the vehicle where the portion of the vehicle obstructs a direct signal path between the at least one other detector and the at least one source.

In an example embodiment including at least one of the features of the method of any of the previous paragraphs, the at least one source is a satellite having a known location within an earth centered earth fixed reference frame.

An illustrative example embodiment of a vehicle navigation system includes detecting means for detecting a signal from at least one source and providing first signal information regarding a distance a detected signal traveled between the at least one source and the at least one detector; and means for determining whether the first signal information corresponds to a direct signal path between the at least one detector and the at least one source or the first signal information corresponds to a reflected signal based on second signal information from at least one other detector that does not have a direct signal path between the at least one other detector and the at least one source, and determining a location of the vehicle based on the first signal information when the first signal information corresponds to the direct signal path between the at least one detector and the at least one source.

In an example embodiment including at least one of the features of the system of the previous paragraph, the at least one source is a satellite having a known location relative to an earth centered earth fixed reference frame, the first signal information comprises a pseudo range between the at satellite and the at least one detector, the second signal information comprises a distance traveled by a reflected signal between the at least one source and the at least one other detector.

The various features and advantages of at least one disclosed example embodiment will become apparent to those skilled in the art from the following detailed description. The drawings that accompany the detailed description can be briefly described as follows.

DETAILED DESCRIPTION

Figure 1:
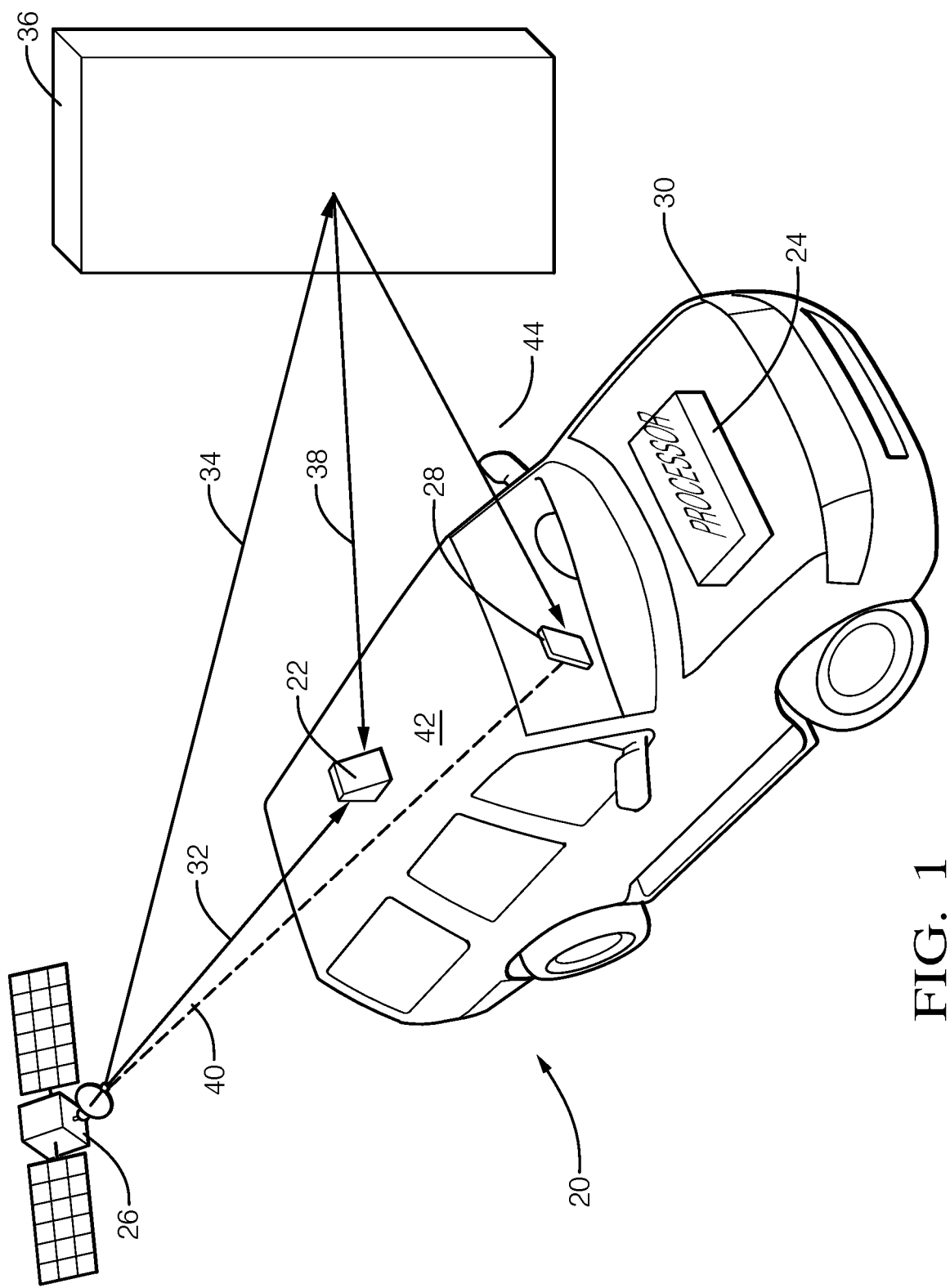
FIG. 1 schematically illustrates an example embodiment of a system for determining a location of a vehicle.

FIG. 1 schematically illustrates a system 20 including a detector 22 and a processor 24. The detector 22 includes an antenna or another device capable of detecting a signal from at least one source. In the embodiment shown in FIG. 1 the detector 22 is configured to detect satellite signals from a satellite 26. Only one satellite is shown for discussion purposes but the detector 22 will often detect multiple satellites. The detector 22 is configured to generate first signal information regarding a distance that a detected signal travels between the satellite 26 and the detector 22.

The processor 24 includes a computing device and associated memory. The processor 24 in some embodiments is a device dedicated to processing signals from the detector 22 while in other embodiments the processor 24 is a device that performs other functions that may be unrelated to processing signals from the detector 22. The processor 24 is configured to determine whether the first signal information from the detector 22 corresponds to a direct signal path between the detector 22 and the satellite 26 or if the first signal information corresponds to a reflected signal. The processor 24 makes this determination based upon second signal information from at least one other detector 28 that provides the second signal information. When the detector 28 does not have a direct signal path between it and the satellite 26, any second signal information from the detector 28 regarding a signal detected from the satellite 26 is the result of a reflected signal detected by the detector 28.

In the embodiment shown in FIG. 1, the system 20 is associated with a vehicle 30 and is useful for determining a location of the vehicle 30. The detector 28 is located within the vehicle 30 such that one or more portions of the vehicle 30 obstructs a direct signal path between the detector 28 and the satellite 26 under at least some conditions.

The condition shown in FIG. 1 includes a direct signal path 32 from the satellite 26 to the detector 22. First signal information from the detector 22 resulting from detecting a signal that travels along the direct signal path 32 is useful for determining a location of the detector 22 and the vehicle 30 because the satellite 26 has a known position relative to an earth centered earth fixed (ECEF) reference frame.

In the condition shown in FIG. 1, it is also possible for the detector 22 to detect a signal from the satellite 26 that is a reflected signal, which should not be used for making location determinations because the distance traveled by a reflected signal will introduce errors into the location determination, which is based in part on the known location of the satellite 26. For example, a signal from the satellite 26 may travel along the path shown at 34 and reflect off a structure 36, such as a building nearby the path of the vehicle 30. The reflected signal may follow a path as schematically shown at 38 and be detected by the detector 22. The distance traveled by the signal following the path 34, 38 is different than the distance of a signal following the direct signal path 32 between the satellite 26 and the detector 22. The processor 24 utilizes first signal information from the detector 22 corresponding to a signal following the direct signal path 32 but does not use first signal information from the detector 22 resulting from a reflected signal detected by the detector 22.

The processor 24 uses second signal information from at least one other detector, such as the detector 28 situated in the vehicle 30, to determine whether the first signal information corresponds to a reflected signal. Given the current location of the satellite 26 and the position of the vehicle 30 relative to the satellite 26, no direct signal path exists between the satellite 26 and the detector 28. The potential direct signal path 40 is obstructed by the roof 42 of the vehicle 30. The position of the detector 28 in the vehicle 30 does allow for the detector 28 to detect a reflected signal from the satellite 26. For example, a signal following the path schematically shown at 34, reflecting off the structure 36 and then following the path schematically shown at 44 may pass through the windshield of the vehicle 30 and be detected by the detector 28. The processor 24 receives second signal information from the detector 28 indicating or corresponding to the distance traveled by the reflected signal following the path 34, 44. The processor 24 uses such second signal information for determining whether first signal information from the detector 22 should be used for purposes of determining a location of the detector 22 and the vehicle 30.

Figure 2:
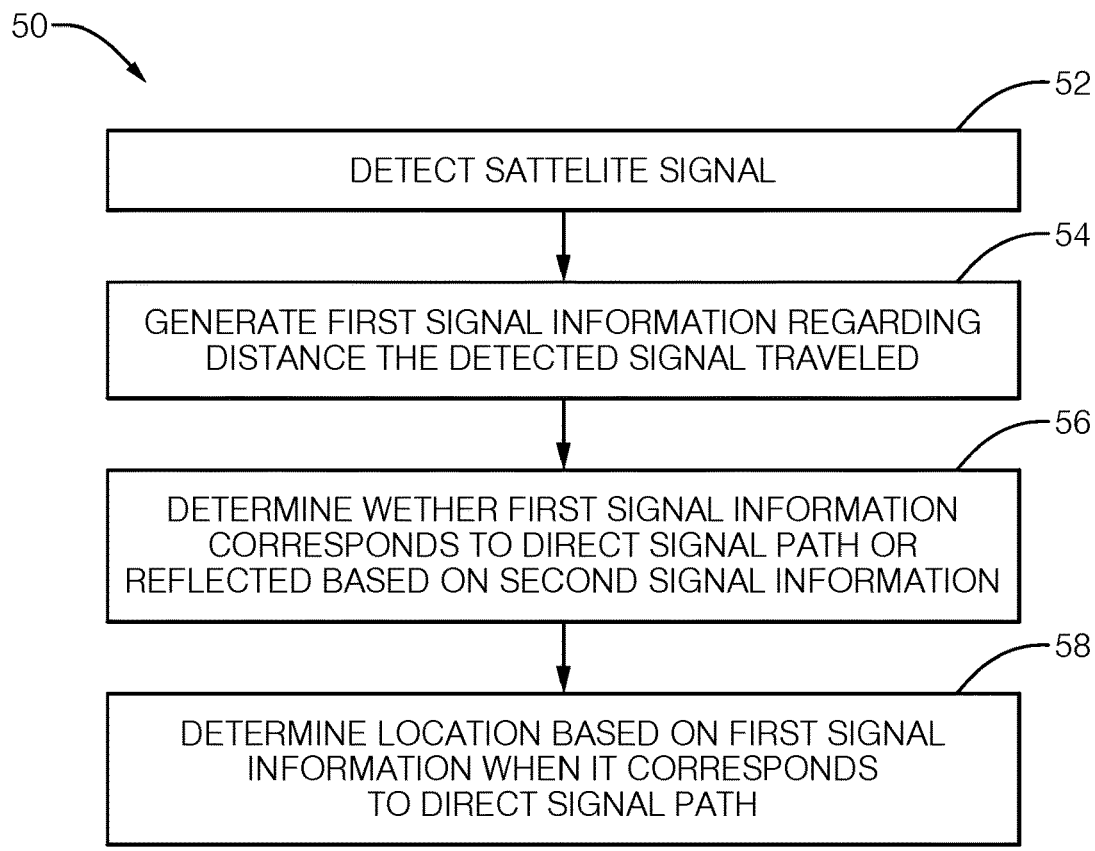
FIG. 2 is a flowchart diagram summarizing an example embodiment of a method of determining a location.

FIG. 2 includes a flowchart diagram 50 that summarizes an example method of determining the location. At 52, the detector 22 detects a signal from the satellite 26. At 54, the detector 22 generates first signal information regarding the distance the detected signal traveled between the satellite 26 and the detector 22. In this example embodiment, the first signal information comprises a pseudo range corresponding to the distance the signal traveled. The first signal information is provided to the processor 24. At 56, the processor 24 determines whether the first signal information corresponds to a direct signal path distance or a reflected distance based on second signal information from the detector 28, which is another pseudo range in this example. The processor 24 determines a difference between the distance of the first signal information and the distance of the second signal information. The processor 24 determines whether the difference between the distances of the first signal information and the second signal information is below a threshold or within a preselected range. When the second signal information is known to correspond to a reflected signal and the distance of the first signal information is sufficiently close to the distance of the reflected signal, the processor 24 determines that the first signal information is the result of the detector 22 detecting a reflected signal rather than a signal following a direct signal path between the satellite 26 and the detector 22.

For example, when the location of interest is the location of the vehicle 30, it can be assumed that any nearby structure 36 from which a satellite signal may reflect resulting in a reflected signal is at least 1.5 meters away from the vehicle 30. A reflected signal likely will travel through such a spacing twice resulting in about three meters difference between the distance traveled by the reflected signal and a direct signal path that does not involve a reflection off that nearby structure 36. In this example, whenever the difference between the distances of the first signal information and the second signal information is within three meters, the processor 24 determines that the pseudo range or distance of the first signal information is the result of a reflected signal because the second signal information is known to be the result of detecting a reflected signal.

At 58, the processor 24 determines the location of the detector 22 or the vehicle 30 based on the first signal information when the first signal information corresponds to detecting a signal received along a direct signal path. In some embodiments any signal that appears to be a reflected signal is rejected or excluded from the information used to determine the location of the vehicle 30 but some embodiments include using such signal information when a sufficiently reliable correction or adjustment can be made by the processor 24.

In some embodiments the detector 28 is part of the system 20 and situated in a known position on the vehicle 30 where the detector 28 is likely to only be able to detect reflected signals from the satellite 26. For example, the detector 28 may be situated relative to the interior of the vehicle 30 where the detector 28 will be effectively shielded by the roof of the vehicle 42 from any direct signal paths from the satellite 26 or other satellites that may be used for location determinations. In such embodiments, the second signal information from the detector 28 is always known to correspond to a reflected signal.

In other embodiments, the detector 28 may be situated on the vehicle 30 in a location where a direct satellite signal path may be obstructed depending on the relative position of the vehicle 30 and the satellite 26. For example, there may be conditions under which the detector 28 has a direct line of sight through the windshield of the vehicle 30 to one or more satellites depending on the relative positions between such satellites and the vehicle 30.

Figure 3:
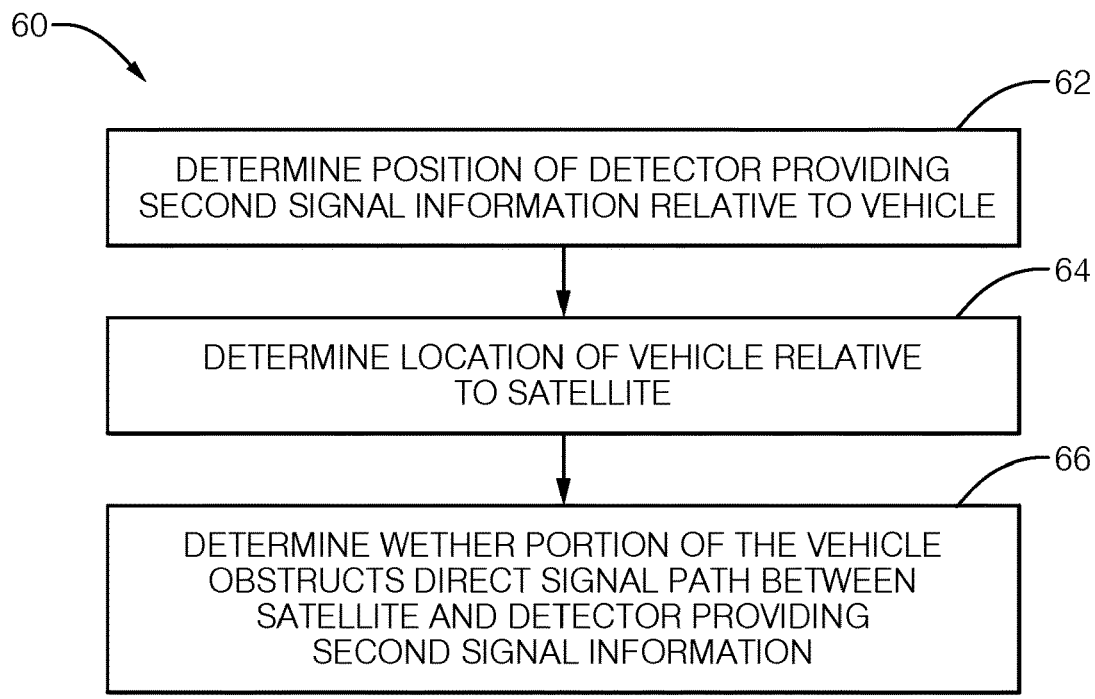
FIG. 3 is a flowchart diagram summarizing an example method of determining when a direct signal path is available between a source and a detector.

FIG. 3 includes a flowchart diagram 60 that summarizes an example technique by which the processor 24 determines whether second signal information from the detector 28 corresponds to a reflected signal. At 62, the processor 24 determines a position of the detector 28 relative to the vehicle. This may be accomplished in different ways known to those skilled in the art depending on the embodiment. When the detector 28 is in a dedicated location on or in the vehicle 30, the position of the detector 28 is known. In other embodiments, the detector 28 is moveable relative to the vehicle 30, such as when the detector 28 is a personal communication device that has GPS capability, such as a cell phone. The processor 24 in such embodiments utilizes known locating techniques for locating a position of the detector 28 relative to the vehicle 30. In an example, the position of the moveable detector relative to the vehicle is determined using radio frequency transmissions from the detector that are received by a plurality of antennas distributed about the vehicle. In this example, the plurality of antennas may be components of a passive entry/passive start (PEPS) system that may be installed on the vehicle. Details for determining the position of the moveable detector are disclosed in U.S. patent application Ser. No. 16/275,374, which is incorporated herein by reference in full.

At 64, the processor 24 determines a location of the vehicle 30 relative to the satellite 26. This may be accomplished, for example, by using a last known position or location of the vehicle 30 and the currently known position of the satellite 26, which is available through a known GNSS almanac to which the processor 24 has access. Based on that relationship and the position of the detector 28 relative to the vehicle 30, the processor 24 is able to determine whether a portion of the vehicle 30 obstructs a direct signal path between the satellite 26 and the detector 28, which provides the second signal information at 66.

In some embodiments, the processor 24 is provided with information regarding the size, shape or both of the vehicle roof 42 and uses that information combined with the relative positions of the vehicle 30 and the satellite 26 for determining when the roof 42 would obstruct a direct signal path between the detector 28 and the satellite 26.

The illustrated example embodiment provides enhanced accuracy for location determinations, such as locating a vehicle. Accurate vehicle location is useful for guided navigation or autonomous vehicle control. By eliminating reflected signals from location determinations, the example system increases the accuracy and reliability of location determinations allowing for satisfying more stringent margin of error requirements.

The various features of the disclosed embodiments are not necessarily limited to the arrangements that are shown. Other combinations of the disclosed features are possible to realize additional or different embodiments.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A system, comprising:
    at least one detector configured to detect a signal from at least one source and provide first signal information regarding a distance a detected signal traveled between the at least one source and the at least one detector; and
    a processor that is configured to
        determine whether the first signal information corresponds to a reflected signal or a direct signal path between the at least one detector and the at least one source by determining if the first signal information indicates a longer distance or pseudo range than a distance or pseudo range indicated by second signal information from at least one other detector that does not have a direct signal path between the at least one other detector and the at least one source, and
        determine a location of the at least one detector based on the first signal information when the first signal information corresponds to the direct signal path between the at least one detector and the at least one source.

2. The system of claim 1, wherein
    the first signal information comprises a pseudo range between the at least one source and the at least one detector; and
    the second signal information comprises a distance traveled by a reflected signal between the at least one source and the at least one other detector.

3. The system of claim 2, wherein the processor is configured to determine that the first signal information corresponds to a reflected signal by
    determining a difference between the pseudo range of the first signal information and the distance of the second signal information and
    determining that the determined difference is below a threshold.

4. The system of claim 2, wherein the processor is configured to determine that the first signal information corresponds to a reflected signal by determining that the pseudo range of the first signal information is greater than the distance of the second signal information.

5. The system of claim 1, wherein
    the at least one detector is associated with a vehicle and the determined location is a location of the vehicle.

6. The system of claim 5, wherein
    the processor is configured to determine whether the second signal information corresponds to a reflected signal between the at least one source and the at least one other detector by
        determining a position of the at least one other detector relative to the vehicle;
        determining a position of the vehicle relative to the at least one source; and
        determining that at least one portion of the vehicle obstructs a direct signal path between the at least one source and the at least one other detector based on the determined positions.

7. The system of claim 6, wherein
    the at least one portion of the vehicle comprises a vehicle roof; and
    the processor uses information regarding at least one of a size of the roof and a shape of the roof to determine that the roof obstructs the direct signal path between the at least one source and the at least one other detector.

8. The system of claim 5, comprising the at least one other detector and wherein the at least one other detector is situated in a known position relative to a portion of the vehicle where the portion of the vehicle obstructs a direct signal path between the at least one other detector and the at least one source.

9. The system of claim 1, wherein the at least one source is a satellite having a known location within an earth centered earth fixed reference frame.

10. A method comprising:
    detecting a signal from at least one source;
    generating first signal information regarding a distance the detected signal traveled between the at least one source and at least one detector; and
    determining whether the first signal information corresponds to a reflected signal or a direct signal path between the at least one detector and the at least one source by determining if the first signal information indicates a longer distance or pseudo range than a distance or pseudo range indicated by second signal information from at least one other detector that does not have a direct signal path between the at least one other detector and the at least one source; and
    determining a location of the at least one detector based on the first signal information when the first signal information corresponds to the direct signal path between the at least one detector and the at least one source.

11. The method of claim 10, wherein
    the first signal information comprises a pseudo range between the at least one source and the at least one detector; and
    the second signal information comprises a distance traveled by a reflected signal between the at least one source and the at least one other detector.

12. The method of claim 11, comprising determining that the first signal information corresponds to a reflected signal by
    determining a difference between the pseudo range of the first signal information and the distance of the second signal information and
    determining that the determined difference is below a threshold.

13. The method of claim 11, comprising determining that the first signal information corresponds to a reflected signal by determining that the pseudo range of the first signal information is greater than the distance of the second signal information.

14. The method of claim 10, wherein the at least one detector is associated with a vehicle and the method comprises determining a location of the vehicle based on the determined location of the at least one detector.

15. The method of claim 14, comprising determining whether the second signal information corresponds to a reflected signal between the at least one source and the at least one other detector by
    determining a position of the at least one other detector relative to the vehicle;
    determining a position of the vehicle relative to the at least one source; and
    determining that at least one portion of the vehicle obstructs a direct signal path between the at least one source and the at least one other detector based on the determined positions.

16. The method of claim 15, wherein the at least one portion of the vehicle comprises a vehicle roof and the method comprises using information regarding at least one of a size of the roof and a shape of the roof to determine that the roof obstructs the direct signal path between the at least one source and the at least one other detector.

17. The method of claim 14, wherein the at least one other detector is situated in a known position relative to a portion of the vehicle where the portion of the vehicle obstructs a direct signal path between the at least one other detector and the at least one source.

18. A system, comprising:
    at least one detector configured to detect a signal from at least one source and provide first signal information regarding a distance a detected signal traveled between the at least one source and the at least one detector; and
    a processor that is configured to
        determine whether the first signal information corresponds to a direct signal path between the at least one detector and the at least one source or the first signal information corresponds to a reflected signal based on second signal information from at least one other detector that does not have a direct signal path between the at least one other detector and the at least one source, and
        determine a location of the at least one detector based on the first signal information when the first signal information corresponds to the direct signal path between the at least one detector and the at least one source,
    wherein
        the at least one detector is associated with a vehicle,
        the determined location is a location of the vehicle, and
        the processor is configured to determine whether the second signal information corresponds to a reflected signal between the at least one source and the at least one other detector by
        determining a position of the at least one other detector relative to the vehicle,
        determining a position of the vehicle relative to the at least one source,
        determining that at least one portion of the vehicle obstructs a direct signal path between the at least one source and the at least one other detector based on the determined positions,
        the at least one portion of the vehicle comprises a vehicle roof, and
        the processor uses information regarding at least one of a size of the roof and a shape of the roof to determine that the roof obstructs the direct signal path between the at least one source and the at least one other detector.

* * * * *